United States Patent
Bonar et al.

(10) Patent No.: US 7,257,304 B2
(45) Date of Patent: Aug. 14, 2007

(54) INTEGRATED OPTICAL DEVICE WITH REDUCED WAVEGUIDE BIREFRINGENCE

(75) Inventors: James Ronald Bonar, Erskine (GB); Michael George Jubber, West Lothian (GB)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/861,972

(22) Filed: Jun. 4, 2004

(65) Prior Publication Data

US 2004/0247276 A1    Dec. 9, 2004

(30) Foreign Application Priority Data

Jun. 5, 2003    (GB) .................... 0312893.1

(51) Int. Cl.
G02B 6/22    (2006.01)
(52) U.S. Cl. ..................... 385/132; 385/14; 385/50
(58) Field of Classification Search .................. None
See application file for complete search history.

(56) References Cited

U.S. PATENT DOCUMENTS

| | | | |
|---|---|---|---|
| 6,374,013 B1 * | 4/2002 | Whiteaway et al. .......... 385/37 |
| 6,542,687 B2 * | 4/2003 | Won et al. .................. 385/132 |
| 6,767,756 B2 * | 7/2004 | Lee et al. ..................... 438/31 |
| 7,018,580 B2 * | 3/2006 | Gorczyca et al. ............ 264/219 |

FOREIGN PATENT DOCUMENTS

| EP | 1 215 783 | 6/2002 |
|---|---|---|
| GB | 2 366 394 | 3/2002 |
| WO | WO 02/14916 | 2/2002 |

OTHER PUBLICATIONS

E. Wildermuth, Ch. Nadler, M. Lanker, W. Hunziker, and H. Melchior, Penalty-Free Polarisation Compensation of $SiO_2$/Si Arrayed Waveguide Grating Wavelength Multiplexers Using Stress Release Grooves, Electronics Letters, 20th Aug. 1998, vol. 34, No. 17, pp. 1661-1663.
U.K. Search Report, Appl. No. GB 0312893.1, dated Oct. 17, 2003.

* cited by examiner

Primary Examiner—Sung Pak
Assistant Examiner—Jerry T. Rahll
(74) Attorney, Agent, or Firm—Patterson & Sheridan, LLP (57) ABSTRACT

Techniques for reducing waveguide birefringence in an integrated planar lightwave circuit chip incorporating a plurality of different optical devices are described and claimed. Each optical device includes waveguides in which the waveguide cores are each disposed on a respective mesa formation formed in a lower cladding layer. In one method, during fabrication of the waveguides, waveguides cores in different devices on the chip are etched to a different depth in a waveguide lower cladding layer, whereby the height of the mesa formation is different in different devices. The different depths are selected to achieve a desired level of waveguide birefringence, preferably minimum waveguide birefringence, in each device. In another technique dummy waveguides are included in one or more devices on the chip in order to optimize the waveguide birefringence in one or more devices for predetermined mesa height(s) used in the chip, or for different mesa heights in the chip.

8 Claims, 6 Drawing Sheets

INTEGRATED OPTICAL DEVICE WITH REDUCED WAVEGUIDE BIREFRINGENCE

CROSS-REFERENCE TO RELATED APPLICATIONS

This application claims foreign priority benefits under 35 U.S.C. §119 to co-pending British patent application number 0312893.1, filed Jun. 5, 2003. This related patent application is herein incorporated by reference in its entirety.

BACKGROUND OF THE INVENTION

1. Field of the Invention

The present invention relates to planar lightguide circuits (PLCs) and, in particular, to PLCs incorporating more than one optical device thereon.

2. Description of the Related Art

In the marketplace for optical components for telecommunications systems, there is an ever-increasing desire for more compact components which include more than one device function. One known way of attempting to achieve this is to integrate more than one optical device in a planar integrated circuit (PLC) chip. Each device comprises waveguides appropriately arranged on the chip to provide desired device functions. For example, an arrayed waveguide grating (AWG) and a power tap (sometimes also referred to as a "tap coupler") can be integrated on a single PLC chip.

In designing any optical device for fabrication on a PLC, the design and fabrication of the optical waveguides is very important. The dimensions of the waveguides, and the separation of one waveguide from another, influence the stress on the waveguides, and hence the birefringence exhibited by the waveguide. The waveguide birefringence may give rise to undesirable polarization dependence properties such as polarization dependent loss (PDL) and polarization dependent wavelength (known commonly as "splitting") of the optical device. For most component manufacturers and their customers it is important for the waveguide birefringence (B) through the device to be as low as possible, ideally zero, where B is commonly defined as the difference between the effective refractive indices experienced by TM and TE polarized light:

$$B = n_{TM} - n_{TE}$$

Figure 1A:
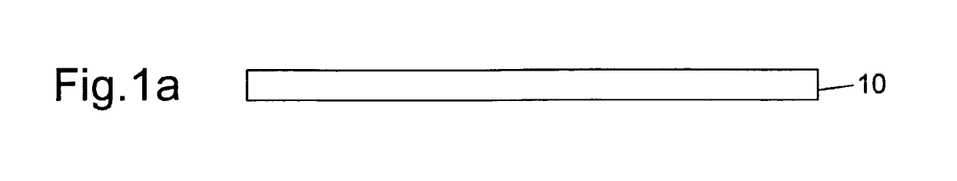
FIGS. 1(a) to (f) are cross-sectional views of a portion of a PLC chip, illustrating six stages respectively in the process for fabricating a waveguide core.
Figure 1B:
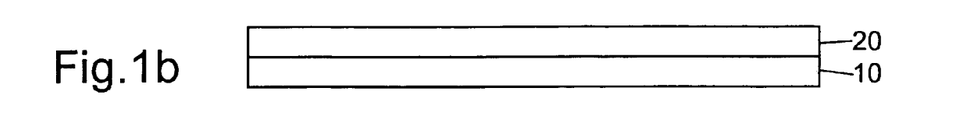
Figure 1C:
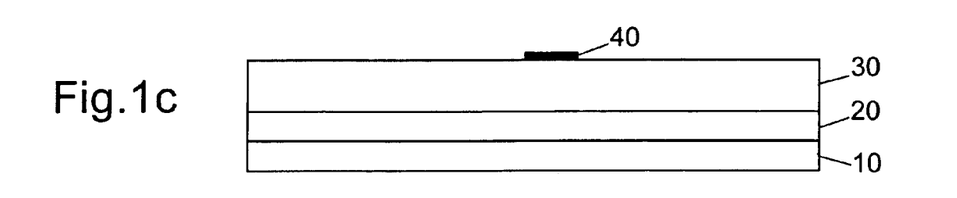
Figure 1D:
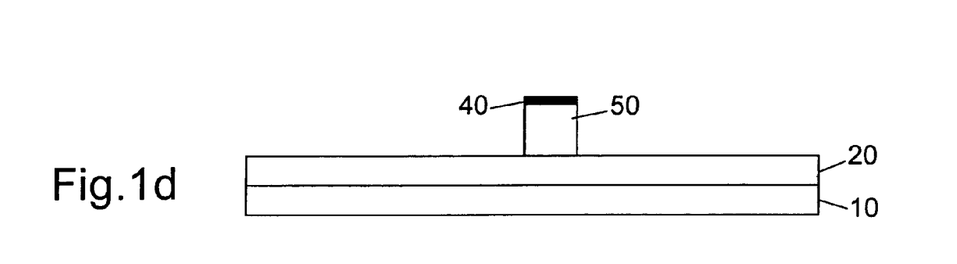
Figure 1E:
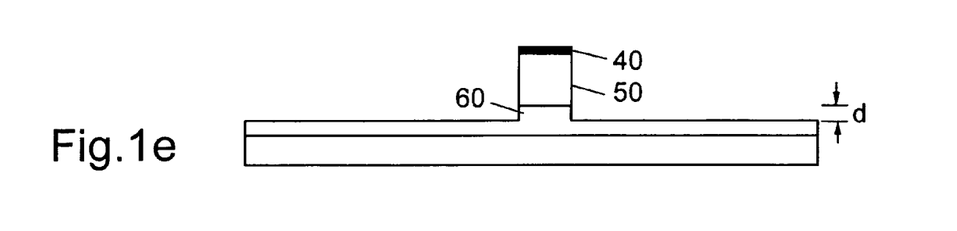
Figure 1F:
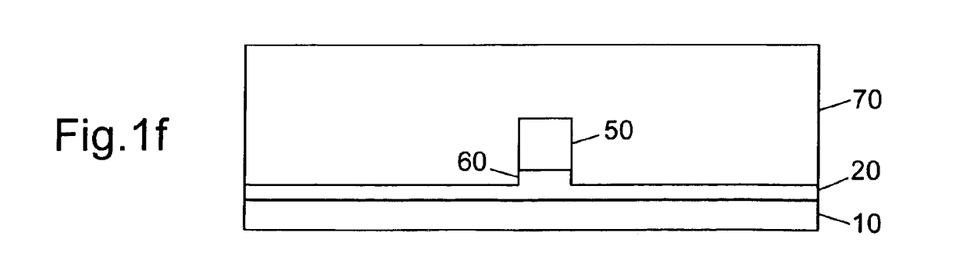

Although the mechanism by which the birefringence arises has not been proven, it is thought to result from the differences in thermal expansion properties between layers in the device structures, which causes stresses to build up when the device is cooled after sintering or annealing. International Patent Application, WO 02/14916, the entire contents of which are hereby incorporated herein by reference, describes a manufacturing technique, which has been invented for controlling and minimizing birefringence in waveguides. In this technique, which is herein referred to as the "over-etch" technique, during the step of etching the waveguide core, the etching is continued beyond the desired core depth, so that the final waveguide core sits on a mesa structure. The technique is here illustrated in FIGS. 1(a) to 1(f). These figures are highly schematic and are, in any case, not to scale. FIG. 1(a) illustrates a silicon substrate 10 on which a thick (e.g. approx 16 µm) thermal oxide undercladding layer 20 is then grown (see FIG. 1(b)). In FIG. 1(c) a layer of waveguide core glass 30 is deposited, for example by Flame Hydrolysis Deposition (FHD). This deposited layer may then be annealed to consolidate it. A mask 40 is then applied to mask the path of a desired waveguide core. The mask can be a metal mask formed by photographically spinning and exposing a resist layer, followed by development and coating with a metal layer by evaporation. The resist and its cover of metal can be lifted off with acetone to leave the metal mask 40. Alternatively, the mask may be made using other known mask materials, such as photoresist or silicon. In FIG. 1(d) an etching step is carried out using conventional wet or dry etching techniques. The etching etches away the parts of the core waveguide layer 30 not covered by the mask 40 (i.e. the regions forming the complement of the desired waveguide path are removed from the layer 30) until the thermal oxide undercladding layer 20 is reached. This leaves the waveguide core 50, which in this example has a substantially square cross-section. In a conventional fabrication process the next step would be to remove the mask 40 and apply an overcladding layer 70 to the structure of FIG. 1(d), but in the inventive process of WO 02/14916 the etching process is continued, still using the mask 40 to define the regions to be etched, so as to etch away part of the undercladding layer 20 in the regions not protected by the mask 40. This "over-etching" process leaves an undercladding layer 20 which is thinner across most of the device but which forms a mesa formation 60 substantially covered by the core 50, as shown in FIG. 1(e). The height d of the mesa formation is herein referred to as the "over-etch depth". The mask 40 is removed and an overcladding layer 70 is then applied to the structure, covering the waveguide core 50 and the oxide undercladding 20, as shown in FIG. 1(f). The over-etch depth is chosen by the PLC designer so as to achieve a desired birefringence in the waveguide, normally to try and achieve the minimum possible birefringence, preferably substantially zero birefringence. Typically, for an AWG an over-etch depth of between 2 and 4 µm is used for the array waveguides. One problem which the designer faces when designing an integrated optical component incorporating multiple device functions is that for different devices integrated on the PLC chip, the aforementioned technique results in the same over-etch depth being applied to all devices present on the PLC chip. In fact, the ideal over-etch for one device may not be the same as the ideal over-etch for another device to be fabricated on the same chip. i.e. the over-etch depth necessary to achieve minimum birefringence in the waveguides of one device may be too shallow, or too deep, an over-etch to achieve minimum birefringence in the waveguides of another device on the same chip. This is particularly the case where there are to be different sets of waveguides with different spatial arrangements on the same PLC chip. For example, where one device is an AWG, there will be a number of very closely spaced channel waveguides forming the array of the AWG and where another device is a tap coupler there may be only two waveguides arranged in a Mach-Zender relationship with a spacing between the two waveguides different to the average array waveguide spacing of the AWG.

It is an aim of the present invention to avoid or minimize one or more of the foregoing disadvantages.

For the avoidance of doubt, the term "different devices" will herein be used to mean not only devices having different functions (e.g. an AWG and a tap coupler), but also to mean any two devices having the same function but designed to be of different size or dimensions and/or to perform differently (e.g. two AWGs having a different number and spacing of arrayed waveguides).

SUMMARY OF THE INVENTION

According to the present invention there is provided a method of fabricating an integrated optical component comprising the steps of:
provi­ding a substrate, at least a face of the substrate having a first cladding layer disposed thereon;
forming a core material layer on the first cladding layer;
forming a plurality of different optical devices on the substrate, each device comprising a plurality of waveguides, each waveguide comprising a waveguide core formed in the core material layer and disposed on a respective mesa formation formed in the first cladding layer; wherein
the method includes the step of selecting an optimum height for the mesa formations in a first said optical device so as to achieve a desired level of waveguide birefringence in said first device, and optimising the waveguide birefringence of at least one other said optical device so as to obtain a required level of waveguide birefringence in the integrated optical component.

The method may include selecting the height of the mesa formations in at least two said optical devices so as to achieve a respective desired level of waveguide birefringence in each of said two devices. This method preferably includes forming all the waveguides in one said device to have a different height of mesa formation than the waveguides in at least one other said device. Preferably, the mesa height in each optical device is selected independently so as to minimise the waveguide birefringence in that optical device. This improves performance of the optical device e.g. reduces device insertion loss (IL) and polarisation dependence.

Alternatively, the method may include forming at least one dummy waveguide in at least one of the optical devices. For example, in addition to selecting an optimum height for the mesa formations in the first optical device (to achieve a desired level of waveguide birefringence in said first device), the step of optimising the waveguide birefringence of said at least one other device may include forming at least one dummy waveguide in said at least one other optical device. The dummy waveguide(s) may conveniently be formed at the same time as the other waveguides in the optical devices are being formed. The number and arrangement of dummy waveguides may be chosen so as to optimise the waveguide birefringence of a said optical device for a given height of the mesa formations in said optical device. For example, the height of the mesa formations in both said first optical device and said at least one other optical device may be selected to be the same height, this height being the optimum height to achieve minimum birefringence in the first optical device, and the number and arrangement of dummy waveguides may be chosen to minimise the waveguide birefringence in said at least one other optical device, for this selected mesa height.

For example, dummy waveguides can be used to reduce the pitch between the array waveguides of an AWG device on the PLC. A smaller pitch between the array waveguides means that a larger over-etch depth will be required to achieve the same level of birefringence in the array waveguides (as compared with the over-etch depth which would be required without the dummy waveguides). So if, for example, there are two AWGs on the same chip, and the array waveguides in one AWG are more widely spaced apart than the array waveguides in the other AWG, the over-etch depth required to achieve a predetermined waveguide birefringence in the more widely spaced apart array will be less than the over-etch depth required to achieve the same waveguide birefringence in the other AWG. To solve this problem dummy waveguides can be inserted in the more widely spaced array so as to reduce the spacing between the array waveguides whereby a greater over-etch depth is then required to achieve the same array waveguide birefringence as would have been required without the dummy waveguides. By careful selection of the number, form and arrangement of dummy waveguides the waveguide birefringence of this AWG can be minimised for the given over-etch depth to be used, this being the over-etch depth required to minimise the waveguide birefringence in the other AWG (with the more closely packed array).

Optionally, dummy waveguides and different over-etch depths may be used together in one integrated optical device. For example, in order to achieve a desired level of waveguide birefringence in the integrated component it may be advantageous to select different mesa heights for two said optical devices in the component and incorporate a plurality of dummy waveguides in at least one of said two optical devices.

While in theory it would be possible to achieve low waveguide birefringence for the integrated optical component by compensation of waveguide birefringence in one said device with waveguide birefringence of substantially equal magnitude but opposite sign in at least one other said device, this may have an undesirable impact on the IL of the integrated component. Thus the above-described techniques in which the respective waveguide birefringence of each different device is minimised independently is much preferred.

One way to achieve different mesa heights (hereinafter also referred to as "over-etch depths") in two optical devices on a single substrate, for example an AWG and a tap coupler, is to use two different masking and etching steps in the fabrication process: one mask and etch step to form the AWG, and a separate mask and etch step to form the tap coupler. Alternatively, the different over-etch depths in different devices on the chip may be achieved by using a grey-scale masking technique during fabrication of the component. Thus, according to a second aspect of the present invention there is provided a method of fabricating an integrated optical component comprising the steps of:
providing a substrate, at least a face of the substrate having a first cladding layer disposed thereon;
forming a core material layer on the first cladding layer;
masking a first region of the core material layer so as to define desired waveguide cores of a first optical device;
using at least some grey-scale masking, masking a second region of the core material layer so as to at least partially define desired waveguide cores of a second optical device;
etching the device in a single etching step so as to define each waveguide core by removing material from the core material layer and at least some material from the first cladding layer, so that the first cladding layer forms a mesa formation under each waveguide core, wherein the grey-scale masking is formed and arranged so that the core material layer is etched to a different depth in the first region than in the second region. Preferably, the grey-scale masking is configured to break down after a predetermined period of etching.

An advantage of this technique is that all the waveguides on the chip can be fabricated using a single mask and a single etching step, but in this single etching step different over-etch depths can be achieved in different devices on the chip.

In the above-described methods, preferably the substrate is made of silicon. The core material layer may be made of silica based glass. The first cladding layer may conveniently be made predominantly of silicon dioxide. A second cladding layer may be formed over the waveguide cores and the first cladding layer. This second cladding layer may be made of silica based glass.

According to a third aspect of the invention there is provided an optical component comprising a plurality of different optical devices integrated in a single planar lightguide circuit (PLC) chip, each device comprising a plurality of waveguides, each waveguide comprising a waveguide core disposed on a first cladding layer, each waveguide core being disposed on a respective mesa formation formed in the first cladding layer, wherein the mesa formation has the same predetermined height in all the waveguides on the chip and wherein at least one dummy waveguide is provided in at least one of the optical devices and is formed and arranged so as to achieve a desired level of waveguide birefringence, most preferably to minimise the waveguide birefringence, of said at least one optical device for the predetermined mesa height.

In one possible embodiment the plurality of different optical devices comprises at least one AWG having a plurality of said dummy waveguides provided therein, one said dummy waveguide being disposed on each side of each array waveguide of said AWG, and the dummy waveguides are formed and arranged such that the percentage increase in length between one array waveguide and the next array waveguide is the same, or substantially the same, as the percentage increase in length between one dummy waveguide and the next dummy waveguide.

BRIEF DESCRIPTION OF THE DRAWINGS

Preferred embodiments of the invention will now be described by way of example only and with reference to the accompanying drawings (not to scale) in which:

FIG. 2b is a cross-section through two array waveguides of the component of FIG. 2a, taken along the line A-A' in FIG. 2a;

FIG. 2c is a cross-section through two array waveguides of the component of FIG. 2a, taken along the line B-B' in FIG. 2a;

DETAILED DESCRIPTION OF THE PREFERRED EMBODIMENT

Figure 2A:
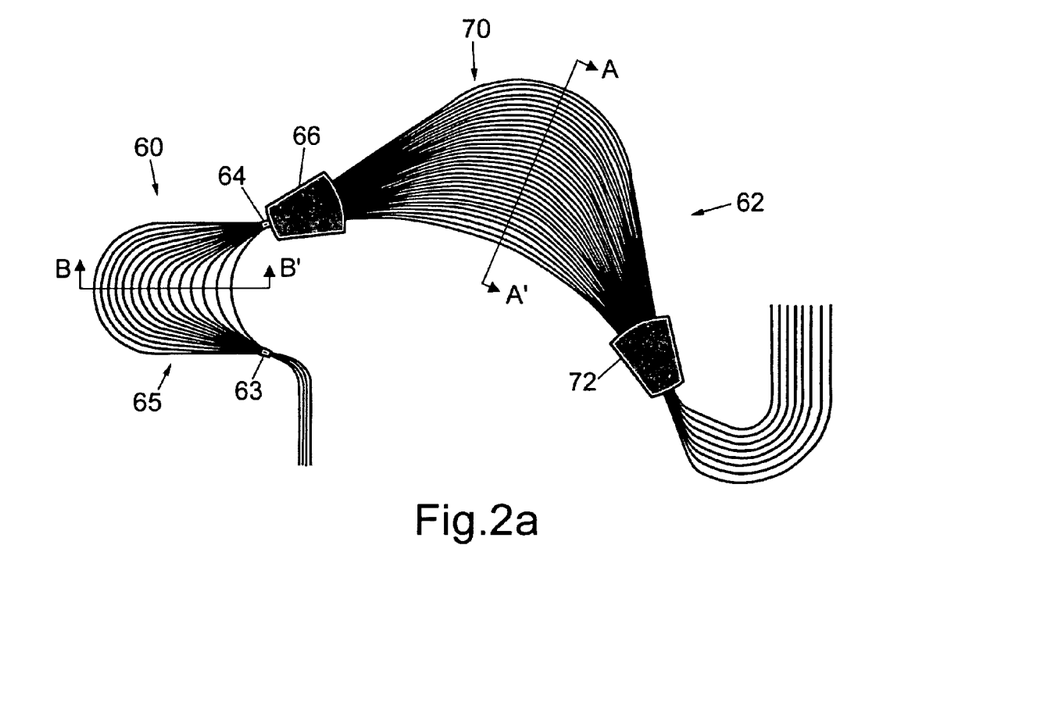
FIG. 2a is a plan schematic view of an integrated bandfilter component incorporating two different AWGs.
Figure 2B:
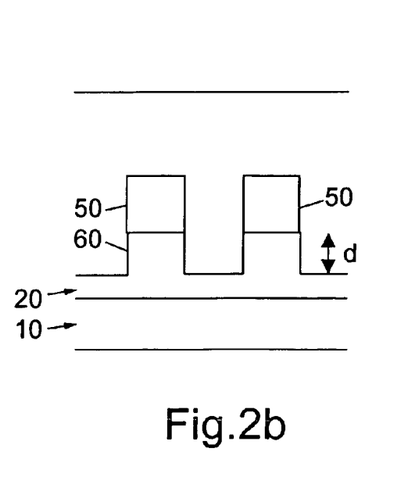
Figure 2C:
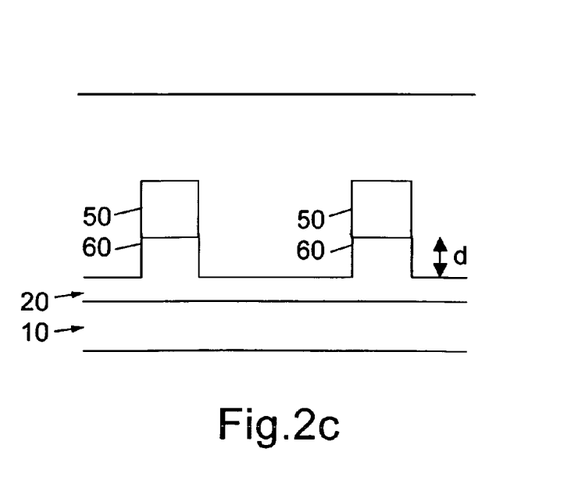

FIG. 2a shows an integrated optical component comprising two arrayed waveguide gratings (AWGs) 60,62 integrated on a single PLC chip. The component is designed to function as a bandfilter. A first one of the AWGs 60 has an array 65 of channel waveguides coupled between an input slab waveguide 63 and an output slab waveguide 64, and has an average waveguide pitch of 80 μm in the array. The other AWG 62 has an array 70 of channel waveguides coupled between an input slab waveguide 66 and a further output slab waveguide 72 and has an average waveguide pitch of 20 μm across the array. The two AWGs 60,62 are integrated together by direct connection of the output slab 64 of the first AWG 60 to the input slab 66 of the second AWG 62. FIGS. 2b,2c show a portion of the cross-section through the centre of each AWG array respectively, illustrating the array waveguide spacing and mesa formations. Like reference numerals are used to reference like parts in FIGS. 1(a) to (e) and FIGS. 2(b) and (c). As shown, the mesa height d (i.e. the "over-etch depth") is the same in each AWG. The interface between the array waveguides 65,70 and the input slab 63,66 of each AWG is known as the input Free Propagation (FPR) Interface of the AWG. Similarly, the interface between the array waveguides 65, 70 and the output slab 64,72 of each AWG is known as the output Free Propagation (FPR) Interface of the AWG. The term "average waveguide pitch" of the array is herein defined as the average of the waveguide spacing at the input FPR interface, the waveguide spacing at the centre section of the array, and the waveguide spacing at the output FPR interface.

Figure 3A:
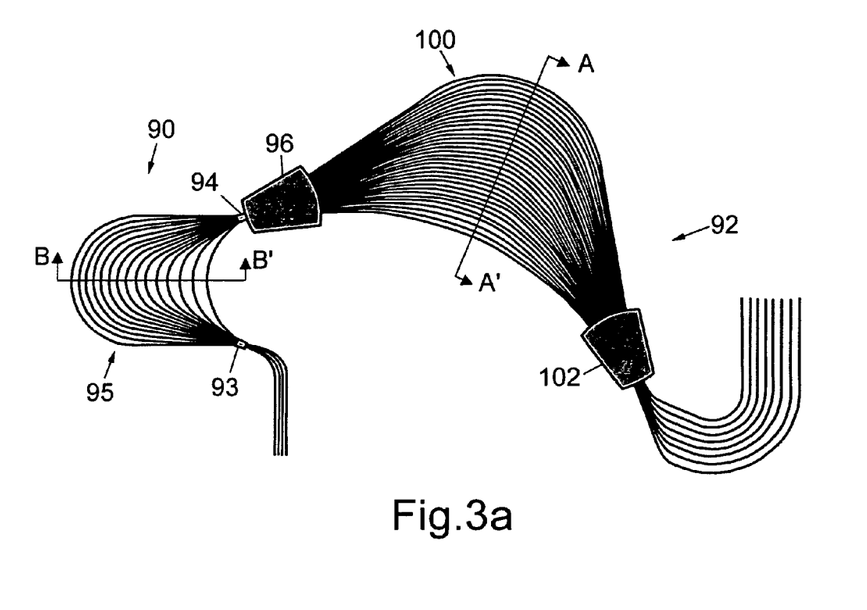
FIG. 3a is a plan schematic view of an integrated bandfilter component incorporating two different AWGs, according to a first embodiment of the invention
Figure 3B:
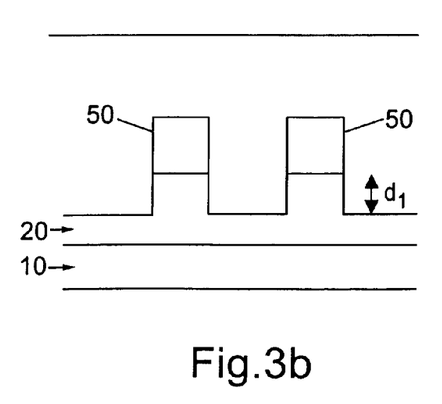
FIG. 3b is a part-view of a cross-section taken along the line A-A' in FIG. 3a, showing two waveguides.
Figure 3C:
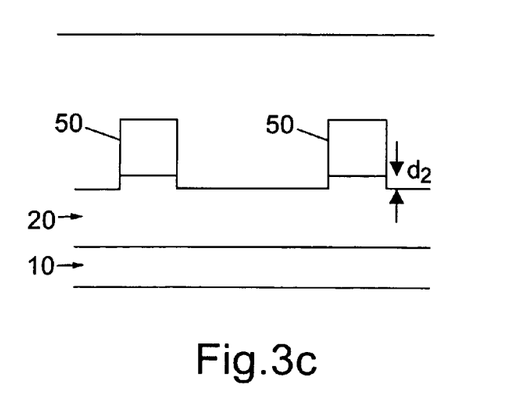
FIG. 3c is a part-view of a cross-section taken along the line B-B' in FIG. 3a, showing two waveguides.

FIGS. 3 a, b and c illustrate an another embodiment of the invention, again consisting of an integrated optical component comprising two arrayed waveguide gratings (AWGs) 90,92 integrated on a single PLC chip. Again, like reference numerals are used to reference like parts in FIGS. 1(a) to (e) and FIGS. 3(b) and 3(c). A first one of the AWGs 90 has an array 95 of channel waveguides coupled between an input slab waveguide 93 and an output slab waveguide 94 and has an average waveguide pitch of 80 μm in the array, and the other AWG 92 has an array 100 of channel waveguides coupled between an input slab 96 and a further output slab waveguide 102 and has an average waveguide pitch of 20 μm across the array. Again, the two AWGs are integrated together by direct connection of the output slab 94 of the first AWG 90 to the input slab 96 of the second AWG 92. Due to a technique used during the fabrication of the component, and described hereunder, in the FIG. 3b embodiment the over etch depth d is not the same for all the waveguides of the integrated component. The technique used may be two separate masking and etching procedures to define the first and the second AWGs 90,92 respectively i.e. a first masking and etching step to define the waveguide cores of the first AWG 90 with the optimum over-etch depth $d_1$ for that AWG so as to minimize waveguide birefringence in that AWG, and a second masking and etching step would then be used to define the waveguides of the second AWG 92 with a different optimum over-etch depth $d_2$ to minimize the waveguide birefringence in that AWG. This technique has the disadvantage of being more time consuming than an alternative technique described hereunder as it requires two masking and etching processes, and it requires very precise alignment during the second masking process.

Figure 5A:
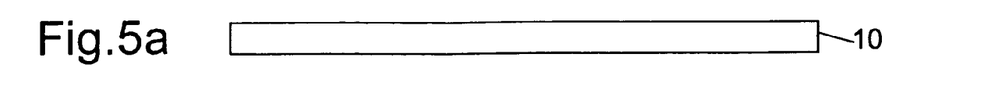
FIGS. 5(a) to (f) are cross-sectional views of a portion of a PLC chip, illustrating six stages respectively in the process for fabricating part of an integrated optical component using a grey scale mask.
Figure 5B:
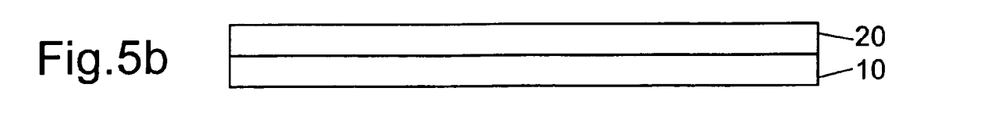
Figure 5C:
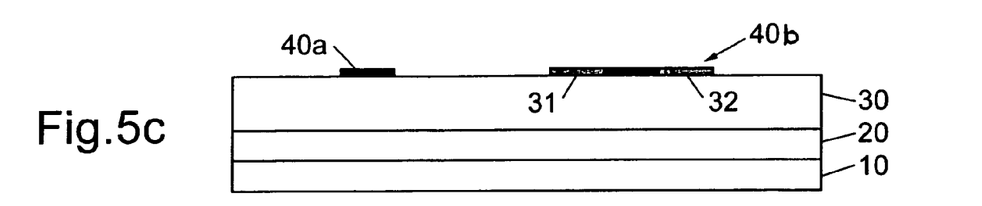
Figure 5D:
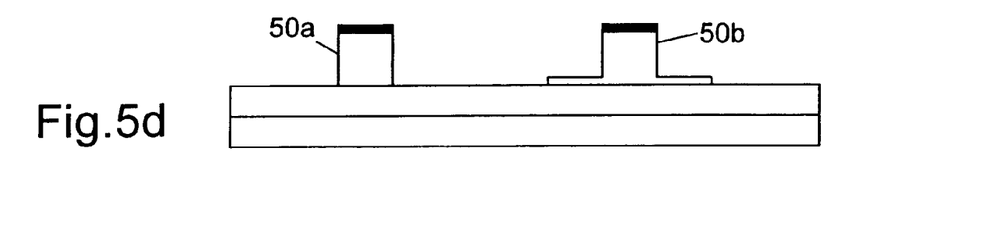
Figure 5E:
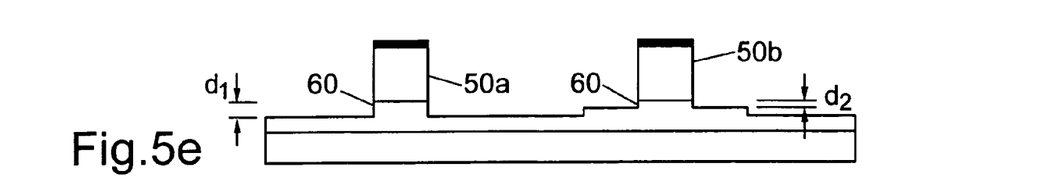
Figure 5F:
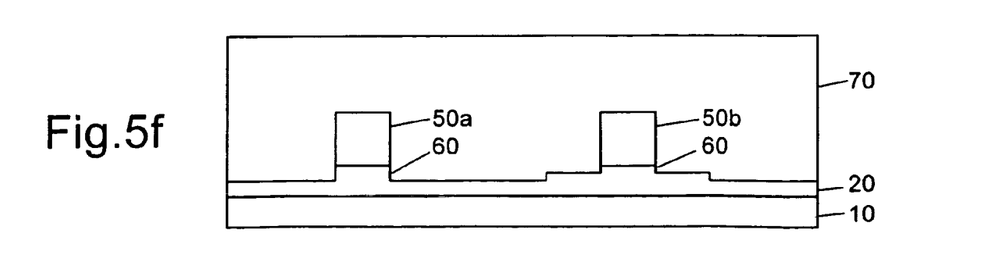

In a preferred embodiment a grey-scale masking technique is used. The waveguide fabrication process is based on the same steps as the basic process already described above with reference to FIGS. 1(a) to (f), but with the difference that at the stage where the mask 40 is to be applied, instead of applying a mask which linearly defines the desired waveguide core profiles 50 in both AWGs 90,92, a special mask is applied. An example process using a grey scale mask is shown in FIGS. 5 (a)-(f). Like reference numerals are used to reference like parts in FIGS. 1 and 5. The special mask comprises one region 40a designed to linearly define the desired waveguide core profiles 50a in a first one of the two AWGs, and another region 40b which is a grey-scale mask designed to partially define the second AWG 93. The grey-scale mask is designed so that although predetermined surface portions of the core layer 30 are not etched (these surface areas will define the upper surfaces of the desired waveguide cores 50b in the second AWG 93), the edges 31,32 of predetermined ones of these surface portions (namely those surface portions defining the array waveguides of the AWG) will not be etched to the same depth as the edges of the waveguide cores defined by the first mask region (defining the cores in the first AWG 92). This can be achieved in several ways, for example by designing the grey-scale mask to break down after a certain amount of etching time. Many types of grey-scale masks are known and would be suitable, for example a plurality of spots or stripes of different numbers and spacings can be used to define the edge regions of the waveguide cores. In the embodiment of FIG. 3a, the designer can calculate in advance the desired different over-etch depths $d_1, d_2$ (shown in FIGS. 3b and 3c) he wishes to have in each AWG, in order to achieve minimum birefringence in the channel waveguides of each AWG, and can then design a grey-scale mask in which grey scale areas defining the edge regions of the channel waveguide cores in (at least) the array are designed to breakdown after a predetermined etching time, so that after some further etching time the channel waveguide cores are fully defined in both AWGs and the over-etch depth $d_1, d_2$ in each AWG array is different and has the desired (predetermined) value in each AWG. By choosing appropriate over-etch depths the designer can thus design each optical device on the chip to have minimum waveguide birefringence (preferably substantially zero birefringence) and hence minimize the polarization dependence in the (whole) integrated optical component. The remaining (linearly defining) mask regions can then be removed and the upper cladding layer 70 applied (FIG. 5f).

Other advanced photolithographic techniques could be used by those skilled in the art to achieve the desired end result.

Figure 4:
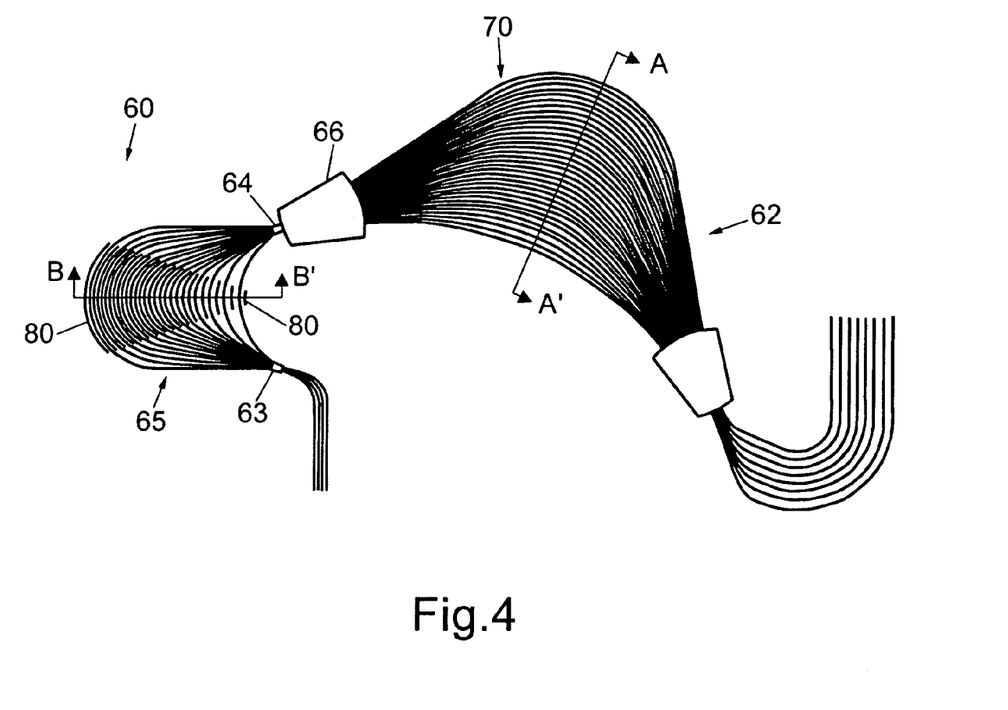
FIG. 4 is a plan schematic view of an integrated bandfilter component incorporating two different AWGs, according to a second embodiment of the invention.

FIG. 4 shows an integrated optical component comprising two arrayed waveguide gratings (AWGs) 60,62 integrated on a single PLC chip according to a second embodiment. Like parts in the FIG. 2 and FIG. 4 devices will be referenced by like reference numerals. In the first AWG 60, in addition to the channel waveguides of the array, there are also a number of dummy waveguides 80 interspersed between the channel waveguides. The dummy waveguides are not connected at either end to the slab waveguides 63, 64. The ends of the dummy waveguides are simply left free. Conveniently, the cross-sectional dimensions of the dummy waveguides are made the same as the channel waveguides in the array 65, although in other possible embodiments this may not be the case. The dummy waveguides 80 are arranged between the channel waveguides in the array in a manner so as to make the average waveguide pitch between the waveguides in the array region (i.e. including the channel waveguides and the dummy waveguides) substantially equal to the average waveguide pitch between the array waveguides in the second AWG 62 (as illustrated in FIG. 4b). This means that the optimum over-etch depth (to achieve minimum birefringence in the array waveguides, and hence lowest possible PDL) in one AWG should be substantially the same as for the other AWG. So when the waveguides (working and dummy) are fabricated, they can all be formed with the same over-etch depth, in a single masking and etching step, this over-etch depth being selected to achieve a desired waveguide birefringence for the whole integrated component. The axial lengths of the dummy waveguides in the array section are (in the preferred embodiment) designed such that the percentage length increase in one array waveguide to the next array waveguide is matched by the same percentage length increase in the associated dummy waveguide to the associated next dummy waveguide. This is the optimum solution, although other lengths of dummy wavelength could alternatively be used.

Figure 6:
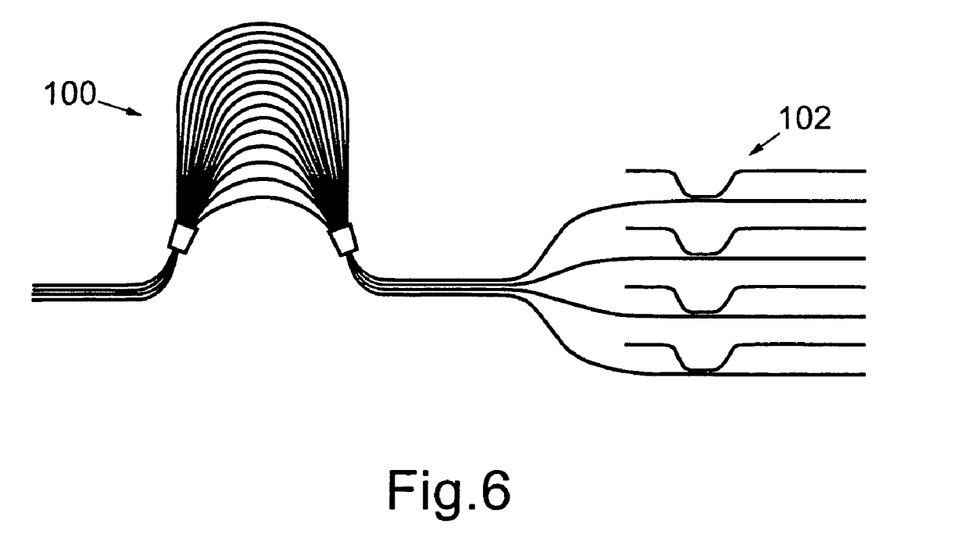
FIG. 6 is a plan schematic view of an integrated component comprising an AWG followed by a tap coupler.

It will be appreciated that various other modifications and variations to the above-described embodiments are possible without departing from the scope of the invention. In particular, the invention is applicable not only to integrated devices incorporating more than one AWG, but to other integrated devices incorporating two or more optical devices on one chip, where each device comprises a plurality of waveguides, and especially for components in which minimum polarization dependence is especially desirable e.g. components incorporating power taps. For example, FIG. 6 illustrates an integrated component comprising an AWG 100 and a tap coupler arrangement 102 based on a plurality of tap couplers (four shown). Different over-etch depths can be used in the AWG and the tap couplers in order to minimize the waveguide birefringence in each device, or dummy waveguides could be provided in the tap coupler and positioned so as to optimize the waveguide birefringence in the tap coupler device for a given uniform over-etch depth applied to the whole chip (this being the optimum over-etch depth to achieve minimum birefringence in the array waveguides of the AWG), so as to in turn minimize the waveguide birefringence exhibited by the integrated component.

Furthermore, it will be appreciated that the two above-described techniques can, if desired, be combined during the design process, in order to design each optical device on a chip to have optimum waveguide birefringence. i.e. both the over-etch depth and the number and position of dummy waveguides in each device can be selected individually for each device so as to minimize the waveguide birefringence in that device. This combination technique can thus be used to minimize the waveguide birefringence of each optical device independently in order to minimize the waveguide birefringence for the whole integrated component.

It will also be generally appreciated that in the above-described embodiments of the invention, one or more further cladding layers (not shown) may be applied on top of the upper cladding layer 70, if desired.

What is claimed is:

1. A method of fabricating an integrated optical component comprising:
   providing a substrate, at least a face of the substrate having a first cladding layer disposed thereon;
   forming a core material layer on the first cladding layer;
   forming a plurality of different optical devices on the substrate, each device comprising a plurality of waveguides, each waveguide comprising a waveguide core formed in the core material layer and disposed on a respective mesa formation formed in the first cladding layer;

selecting an optimum height for the mesa formations in a first said optical device so as to achieve a desired level of waveguide birefringence in said first device, and optimizing the waveguide birefringence of at least one other said optical device so as to obtain a required level of waveguide birefringence in the integrated optical component; and forming at least one dummy waveguide in at least one of the optical devices, wherein the at least one dummy waveguide is selected so as to achieve a desired level of waveguide birefringence in the optical device in which the dummy waveguides are formed.

2. The method according to claim 1, wherein each said dummy waveguide is formed at the same time as the other waveguides in the optical devices are being formed.

3. The method according to claim 1, wherein the mesa formations in each said optical device have the same predetermined height and the number and arrangement of dummy waveguides is selected so as to optimize the waveguide birefringence of at least one said optical device for said predetermined height of the mesa formations, so as to obtain the required level of waveguide birefringence in the integrated optical component.

4. The method according to claim 1, wherein the height of the mesa formations in the first said optical device is different from the height of the mesa formations in the at least one other said optical device.

5. A method of fabricating an integrated optical component comprising the steps of:

providing a substrate, at least a face of the substrate having a first cladding layer disposed thereon;

forming a core material layer on the first cladding layer;

forming a plurality of different optical devices on the substrate, each device comprising a plurality of waveguides, each waveguide comprising a waveguide core formed in the core material layer and disposed on a respective mesa formation formed in the first cladding layer; wherein the method includes the step of selecting an optimum height for the mesa formations in a first said optical device so as to achieve a desired level of waveguide birefringence in said first device, and optimizing the waveguide birefringence of at least one other said optical device so as to obtain a required level of waveguide birefringence in the integrated optical component; and forming all the waveguides in one said device to have a different height of mesa formation to the waveguides in at least one other said device, wherein the respective mesa heights in at least two said optical devices are selected so that the waveguide birefringence in one said device is of substantially equal magnitude but opposite sign to the waveguide birefringence in the other said device.

6. The method according to claim 1, wherein at least one said dummy waveguide is formed and arranged so as to achieve a minimum level of waveguide birefringence of said at least one optical device for the predetermined mesa height.

7. The method according to claim 1, wherein the predetermined mesa height is the optimum height to achieve minimum birefringence in another of the optical devices.

8. The method according to claim 1, wherein the plurality of different optical components comprises at least one AWG having a plurality of said dummy waveguides provided therein, one said dummy waveguide being disposed on each side of each array waveguide of said AWG, and the dummy waveguides are formed and arranged such that the percentage increase in length between one array waveguide and the next array waveguide is substantially the same as the percentage increase in length between one dummy waveguide and the next dummy waveguide.

* * * * *